US007021061B2

(12) United States Patent
Tiemann

(10) Patent No.: US 7,021,061 B2
(45) Date of Patent: Apr. 4, 2006

(54) HEAT SHIELD ARRANGEMENT FOR A HOT-GAS CONDUCTING COMPONENT, IN PARTICULAR FOR STRUCTURAL PIECES OF GAS TURBINES AND METHOD FOR PRODUCTION OF SAID ARRANGEMENT

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 180 days.

(21) Appl. No.: 10/697,336

(22) Filed: Oct. 30, 2003

(65) Prior Publication Data

US 2004/0206087 A1 Oct. 21, 2004

Related U.S. Application Data

(63) Continuation of application No. PCT/EP02/05578, filed on May 21, 2002.

(51) Int. Cl.
*F02C 3/00* (2006.01)
*F02C 7/28* (2006.01)

(52) U.S. Cl. ........................ 60/752; 277/312; 277/630; 277/647; 110/336

(58) Field of Classification Search .......... 60/752–760, 60/772; 110/336–340; 277/312, 630, 647
See application file for complete search history.

(56) References Cited

U.S. PATENT DOCUMENTS

| | | | | |
|---|---|---|---|---|
| 2,991,045 | A * | 7/1961 | Tassoni | 415/135 |
| 3,728,041 | A * | 4/1973 | Bertelson | 415/189 |
| 4,537,024 | A * | 8/1985 | Grosjean | 60/791 |
| 5,158,430 | A * | 10/1992 | Dixon et al. | 415/134 |
| 5,417,056 | A * | 5/1995 | Johnson et al. | 60/260 |
| 6,203,025 | B1 * | 3/2001 | Hayton | 277/644 |

FOREIGN PATENT DOCUMENTS

| | | | |
|---|---|---|---|
| CH | 392 359 | | 5/1965 |
| DE | 19643715 | * | 4/1998 |
| EP | 0 224 817 B1 | | 6/1987 |
| EP | 0 778 408 A2 | | 6/1997 |
| EP | 0 896 128 A2 | | 2/1999 |
| EP | 1 022 437 A1 | | 7/2000 |

* cited by examiner

*Primary Examiner*—Ted Kim

(57) ABSTRACT

The invention relates to a heat shield arrangement for a hot gas conducting structure, in particular a metal component of a gas turbine unit or combustion chamber, with the heat shield elements anchored adjacently on a support structure to cover a surface. Said heat shield elements each comprise a lateral groove, arranged in the region of the edge of the surface thereof facing the hot gas, at least two adjacent shield elements are connected by at least one seal element mounted in the groove. The seal element is embodied as a sealing flap, which may be displaced from a first position to a second position and vice versa, whereby the first position is an open position without a sealing effect and the second position is a closed position with a sealing effect. According to said method the sealing flap is moved from the first to the second position by the movement of a heat shield element.

18 Claims, 2 Drawing Sheets

HEAT SHIELD ARRANGEMENT FOR A HOT-GAS CONDUCTING COMPONENT, IN PARTICULAR FOR STRUCTURAL PIECES OF GAS TURBINES AND METHOD FOR PRODUCTION OF SAID ARRANGEMENT

This application is a continuation of International Application No. PCT/EP02/05578, filed May 21,2002 and claims the benefit thereof. The International Application claims the benefits of European application No. 01112710.7 filed May 25, 2001, both applications are incorporated by reference herein in their entirety.

FIELD OF INVENTION

The invention relates to a heat shield arrangement for a hot-gas conducting component, in particular for structural parts of gas turbines. It further relates to a method for producing said arrangement.

BACKGROUND OF INVENTION

The arrangement contains a plurality of heat shield elements disposed adjacently on a support structure and anchored to this to cover a surface, and wherein at least two adjacent heat shield elements each have at least one lateral groove, arranged in the region of the edge of the surface thereof facing the hot gas, these heat shield elements being connected by means of at least one seal element installed in the groove. An arrangement of this type is known, for example, from EP 1 022 437 A1 or from EP 0 896 128 A2.

The high temperatures prevailing in hot-gas chambers necessitate protecting a support structure exposed to hot gas. This can be done, for example, by lining the hot-gas chamber with heat shield elements whose surface facing the hot gas is cooled.

EP 0 224 817 B1 describes a heat shield arrangement, in particular for structural parts of gas turbine units, which is formed from a number of triangular heat shield elements. The heat shield elements are arranged adjacently, with a gap being left in each case, on a support structure and screwed to said structure.

A disadvantage of this is that hot gas from the combustion chamber can pass through the above-mentioned gaps and make contact with the support structure with the result that the material of the support structure can be damaged by the resulting massive heat impact.

The German patent application with the application file number 100 03 728.3 discloses a heat shield arrangement consisting of a number of heat shield elements wherein seal elements, preferably checker plates, are installed between the heat shield elements to prevent the escape of hot gas from the combustion chamber and thus protect the support structure.

A disadvantage of said arrangement is, for example, that a heat shield element with this type of arrangement cannot be installed or released independently of its adjacent heat shield elements. If, for instance, only the anchorage of one heat shield element were released when said arrangement was being released, for repair purposes for example, and an attempt then made to remove the heat shield element, such an attempt would fail because the seal elements belonging to the adjacent heat shield elements would at least have to be removed manually before the heat shield element could be withdrawn from the arrangement which, however, is not possible without releasing the adjacent heat shield elements from the support structure or at least loosening their anchorage and displacing them to an eccentric position with the result that the gap between the heat shield elements is enlarged.

Also during the production of this type of arrangement the heat shield elements cannot simply be anchored to the support structure independently of each other; instead, a relatively large gap must first be formed between the heat shield elements in each case, the seal element then installed, the gap then reduced in size, and the heat shield elements finally anchored to the support structure.

SUMMARY OF INVENTION

The object of the invention is accordingly to disclose a heat shield arrangement for a hot-gas conducting structure, in particular a metal component of a gas turbine unit or combustion chamber, with heat shield elements anchored adjacently on a support structure to cover a surface, and a method for producing said type of heat shield arrangement which in particular overcomes the described disadvantages, is flexible in its application, and can be produced particularly easily and quickly.

As regards the arrangement, the object is achieved according to the invention by means of a heat shield arrangement with heat shield elements anchored adjacently on a support structure to cover a surface wherein at least two adjacent heat shield elements each have at least one lateral groove, arranged in the region of the edge of the surface thereof facing the hot gas.

With a heat shield arrangement according to the invention, on the one hand the support structure is protected from making contact with hot gas escaping from the combustion chamber by means of the seal element which closes gaps between the heat shield elements of the heat shield arrangement. On the other hand, a heat shield arrangement according to the invention is easy to produce and release on account of the particular embodiment of the seal element as a sealing flap because, on being installed or released, the seal element can be displaced from a first to a second position or vice versa so that when the arrangement according to the invention is produced the seal element is automatically displaced from its first (open) position to its second (closed) position and, on being released, the arrangement according to the invention is automatically displaced from its second to its first position. This means it is not necessary to manually displace the seal to its second (closed) position or remove it from its second position. It is possible, moreover, to remove a single heat shield element without having to release the anchorages of adjacent heat shield elements.

Practically the entire area of a hot-gas chamber exposed to the hot gas can be covered by means of such seal elements between, in each case, two adjacent heat shield elements. It must be said, however, that special designs may be necessary at particular locations (such as at the location of measuring equipment and inward or outward ducts for gasses in the hot-gas chamber etc.), although the invention is suitable for sealing at least the majority of the heat shield elements in the arrangement from each other by means of such flaps.

A separate operating step is not required to put the seal elements into the arrangement according to the invention when the arrangement according to the invention is produced; instead, the seal elements move automatically into their second (closed) position as the result of the movement of a heat shield element which is to be used, without the need to release the anchorages of adjacent heat shield elements on the support structure.

The seal element advantageously has an essentially C-shaped cross-section. A seal element cross-section of this type is especially suitable as the (longitudinal) slot formed in this way can be employed with particular facility for retaining the seal element in the first position by, for example, attaching the slot of the seal element to the wall of a groove and so retaining it in the first position.

In an advantageous embodiment of the invention the seal element is designed as a bent plate. The seal element is particularly easy to produce if produced by bending a plate, as a very large number of raw materials are available in plate form.

The plate is advantageously made of sheet metal.

The high degree of heat resistance which is a feature of sheet metal makes it particularly suitable for use as a seal element for the heat shield arrangement according to the invention. Sheet metal is furthermore readily available, economically priced, and especially easy to work.

The invention furthermore leads to a method for producing a heat shield arrangement according to the invention with the following steps:

1. A first and a second heat shield element are anchored on the support structure, leaving a space for a third heat shield element, such that the groove of the first heat shield element is located opposite the groove of the second heat shield element.

2. A seal element is in each case inserted into the groove of the first and the second heat shield element in such a way that the seal element is retained in the first position.

3. The third heat shield element, having in each case a groove on opposite sides, is displaced into the space toward the support structure, with one seal element in each case protruding into one of these grooves.

4. The seal element is displaced into the second position through the movement of the third heat shield element, and 5. The third heat shield element is anchored on the support structure.

It is particularly advantageous with the method according to the invention that the seal between the heat shield elements is formed automatically without the need for a manual operating step: the seal element embodied as a sealing flap is displaced automatically from its first (open) position into its second (closed) position, being, for example, pressed together and inserted into the groove advantageously in the manner of a turning motion. Pressing together of the seal element will improve the sealing effect if the thus "pre-tensioned" seal element is finally inserted into the groove positioned firmly against the walls of the groove; it furthermore secures the second (closed) position of the sealing flap against falling out of the groove.

Two exemplary embodiments of the invention are set out in greater detail below.

DETAILED DESCRIPTION OF INVENTION

Figure 1:
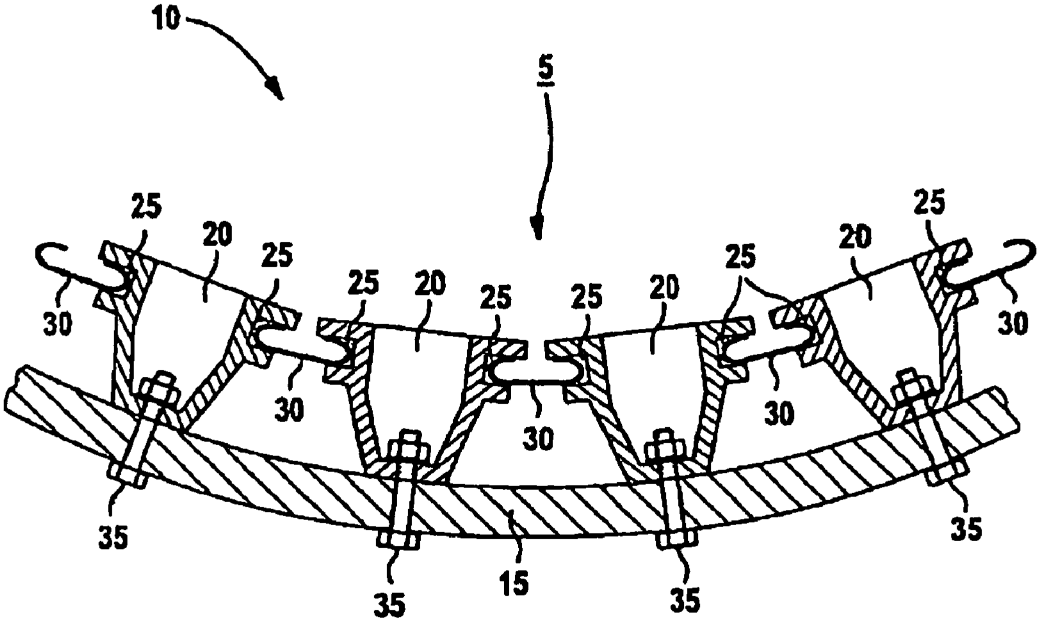
FIG. 1 shows a cross-section of an arrangement according to the invention.

FIG. 1 shows a heat shield arrangement 5 according to the invention.

The heat shield arrangement 5 protects a support structure 15 from the destructive effect of hot gas formed in a combustion chamber 10.

The heat shield arrangement 5 comprises heat shield elements 20 arranged adjacently on the support structure 15 to cover a surface and anchored to this support structure 15 by means of securing elements 35, for example screw connections.

Between the individual heat shield elements 20 there is in each case a gap through which the hot gas formed in the combustion chamber could penetrate and attack the support structure 15. Because of the thermal expansion of the heat shields and also in order to allow easy serviceability, it is not possible to dispense with a gap.

The above described gaps between the heat shield elements 20 are sealed by means of seal elements 30 in order to protect the support structure 15 from being damaged or destroyed.

The heat shield elements 20 have in each case at least one lateral groove 25 arranged in the region of the edge of the surface thereof facing the hot gas. A seal element 30 is installed in the grooves 25 of in each case adjacent heat shield elements 20.

The seal element 30 is embodied as a sealing flap which may be displaced from a first to a second position, whereby the first position is an open position without a sealing effect and the second position is a closed position with a sealing effect. FIG. 1 shows the seal elements 30 in the second position. The seal elements 30 advantageously have an essentially C-shaped cross-section. The seal elements 30 can be produced, for example, from a flat plate which consists preferably of sheet metal and which has been worked by bending so as to have a C-shaped cross-section. A C-shaped sealing flap of this type exhibits an elasticity facilitating sprung attachment to the heat shield elements and good sealing.

The first position, not shown in FIG. 1, of the seal element 30 can be formed by, for example, keeping the seal element 30 with its (longitudinal) slot, embodied as a consequence of the C-shaped cross-section, on the edge of the groove 25 situated closer to the combustion chamber 10 through the protrusion of the cited wall into the slot (see FIGS. 2*b* and 2*c*).

Figure 2:
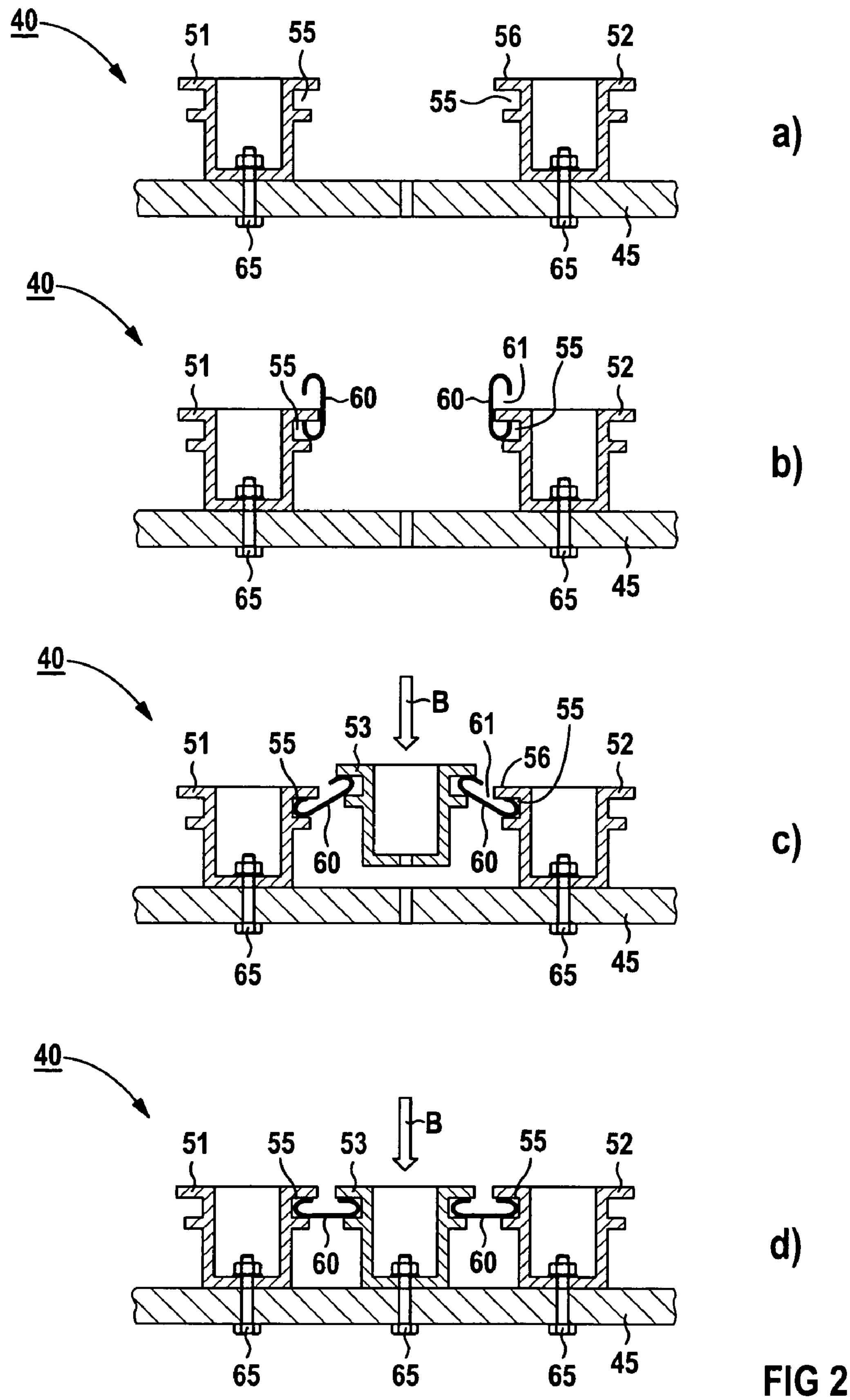
FIG. 2 shows the steps in a procedure according to the invention.

FIG. 2 shows steps a) to e) of the procedure according to the invention.

In step a), a first and a second heat shield element 51, 52 are anchored on the support structure by means of in each case a screw connection 65, for example, leaving a space for a third heat shield element 53 so that the groove of the first heat shield element 51 is situated opposite the groove of the second heat shield element 52.

In step b), a seal element 60 is in each case installed in the groove 55 of the first and of the second heat shield element 51, 52 in such a way that the seal element 60 is retained in the first position (open position without a sealing effect). In the present exemplary embodiment the first position is provided whereby an edge 56, situated closer to the combustion chamber 40, of a groove 55 is inserted into a (longitudinal) slot 61 of the seal element 60.

In step c), the third heat shield element 53, having in each case a groove 55 on opposite sides, is moved into the space in direction B, with a seal element 60 in each case protruding into one of the previously described grooves of the third heat shield element 53.

In step d), movement B of the third heat shield element 53 causes the seal element 60 to be displaced into the second position (closed position with a sealing effect). To achieve an improved sealing effect the seal element 60 can be pressed together and inserted into the groove 55 by means, for example, of a turning motion.

In step e), the third heat shield element 53 is finally anchored on the support structure 45 by means, for example, of a screw connection 65.

With the method, shown in FIG. 2, according to the invention for producing a heat shield arrangement according to the invention, the required second position of the seal element 60 implementing the sealing effect with respect to the hot gas formed in the combustion chamber 40 does not have to be produced manually in, for example, a separate operating step. Through the special embodiment of the seal element 60 as a sealing flap, sealing takes place automatically with the method according to the invention for producing a heat shield arrangement according to the invention when the third heat shield element 53 is installed in the space between the first and the second heat shield element 51, 52.

It is furthermore unnecessary to release the anchorage of the first and of the second heat shield element 51, 52 when the third heat shield element 53 is installed in order, for example, to install the seal element 60.

The seal element 60 can be displaced by means of the movement B of the third heat shield element 53 both to the second position and, by means of a movement of the third heat shield element 53 in the opposite direction to B, to the first position, so the arrangement according to the invention can also be released easily without, for example, the need to remove the seal element in a separate, manual operating step.

Figure 3:
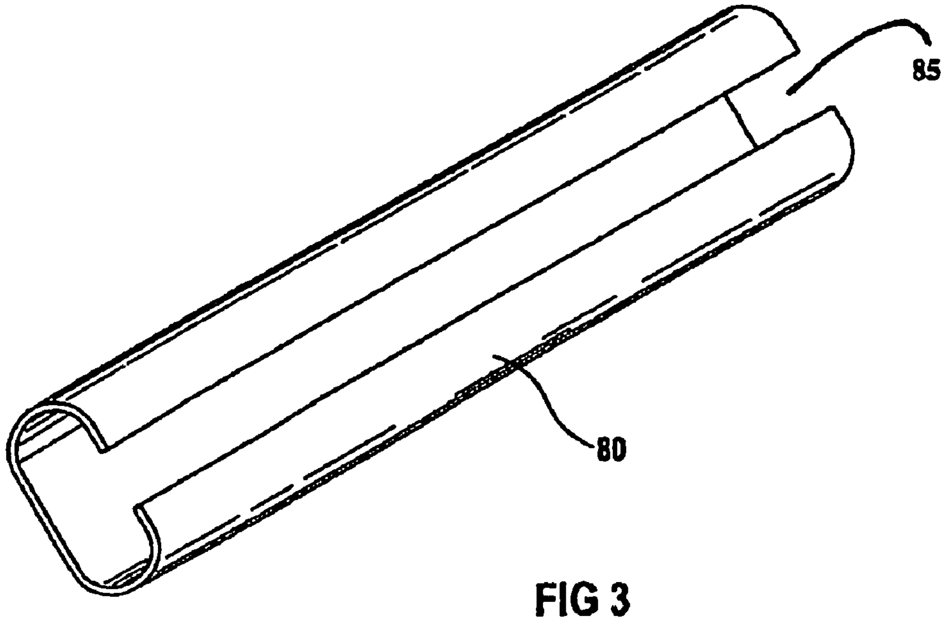
FIG. 3 shows an exemplary embodiment of a seal element for a heat shield arrangement according to the invention.

FIG. 3 shows an exemplary embodiment of a seal element 80 for use in a heat shield arrangement according to the invention and/or for the method according to the invention.

The seal element 80 is embodied as a hollow tube made, for example, of sheet metal, having an oval, essentially C-shaped cross-section. The surface shell of this hollow tube has a slot 85 extending essentially across the entire length of the seal element 80.

The slot 85 is especially suitable for retaining the seal element 80 in its first position (open position without a sealing effect) whereby, for example, one of the boundary walls of a groove of a heat shield element is inserted into the slot 85 and the seal element 80 is in this way retained in the first position (see also, for example, FIG. 2, step b). The part of the seal element 80 protruding beyond the groove is then accessible through the movement of a heat shield element and the seal element 80 consequently relocatable to the second position.

The seal element 80 consists preferably of sheet metal which has been worked into the shape according to FIG. 3 by, for example, bending.

What is claimed is:

1. A heat shield arrangement for a hot-gas conducting structure, comprising:

a support structure;

a first heat shield element having a groove arranged toward a surface of the first heat shield element that faces the hot gas and is anchored to the support structure;

a third heat shield element having a groove arranged toward a surface of the third heat shield element that faces the hot gas and arranged non-adjacent to the first heat shield element and anchored to the support structure;

a second heat shield element arranged between to the first heat shield element and the third heat shield element and having a groove arranged toward a surface of the second heat shield element that faces the hot gas;

a first seal element arranged in the groove of the first heat shield element and connecting the first heat shield element with the second heat shield element, the first seal element and the groove contoured and dimensioned such that the first seal element is adapted to be swiveled from an open position to a closed position through an intermediary position in the groove during movement of the second heat shield element vertically; and a second seal element arranged in the groove of the third heat shield element and connecting the third heat shield element with the second heat shield element, the second seal element and the groove contoured and dimensioned such that the second seal element is adapted to be swiveled from an open position to a closed position through the intermediary position in the groove during movement of the second heat shield element vertically, wherein in the open position the first and second seal elements are not connected with the second heat shield element, in the intermediary position the first and second seal elements are connected with the second heat shield element and the second heat shield element is spaced from the support structure, and in the closed position the first and second seal elements are engaged with the second heat shield element.

2. The heat shield arrangement according to claim 1, wherein the seal element has a substantially C-shaped cross-section.

3. The heat shield arrangement according to claim 2, wherein the seal element is adapted to be retained in an open position without a sealing effect as a consequence of the longitudinal slot embodied through the C-shaped cross-section.

4. The heat shield arrangement according to claim 2, wherein the seal element is a bent plate.

5. The heat shield arrangement according to claim 1, wherein the seal element is a bent plate.

6. The heat shield arrangement according to claim 5, wherein the plate comprises sheet metal.

7. The heat shield arrangement according to claim 6, wherein the seal element is adapted to be retained in an open position without a sealing effect as a consequence of the longitudinal slot embodied through the C-shaped cross-section.

8. The heat shield arrangement according to claim 5, wherein the seal element is adapted to be retained in an open position without a sealing effect as a consequence of the longitudinal slot embodied through the C-shaped cross-section.

9. The heat shield arrangement according to claim 1, wherein the hot-gas conducting structure is a metal component of a gas turbine unit.

10. The heat shield arrangement according to claim 1, wherein the hot-gas conducting structure is a combustion chamber.

11. The heat shield arrangement according to claim 1, wherein the first and second seal elements are adapted to be swiveled from the closed position to the open position.

12. The heat shield arrangement according to claim 1, wherein a continuous heat shield is formed from a plurality of heat shield elements and seal elements.

13. The heat shield arrangement according to claim 1, wherein the spacing between the first heat shield element and the second heat shield element and the spacing between the second heat shield element and the third heat shield element remains about the same when the second heat shield element is being moved vertically while the first and third heat shield elements are anchored to the support structure.

14. The heat shield arrangement according to claim 1, wherein the second heat shield element can be removed with the first and third heat shield elements anchored to the support structure.

15. A method for producing a heat shield arrangement, comprising:

providing a support structure;

providing a plurality of shield elements arranged adjacently on the support structure and anchored to the support structure to cover a surface, at least two adjacent heat shield elements having at least one lateral groove arranged in a region of an edge of the surface facing the hot gas;

providing at least one seal element installed in the groove and connecting the heat shield elements, the seal element and the grooves contoured and dimensioned such that the seal element is adapted to be swiveled from an open position to a closed position through an intermediary position in the grooves during movement of at least one of the heat shield elements vertically with respect to its surface facing the hot gas;

anchoring a first and a second heat shield element on the support structure leaving a space for a third heat shield element so that the groove of the first heat shield element is situated opposite the groove of the second heat shield element;

installing a seal element in each case in the groove of the first and of the second heat shield element in such a way that the seal element is retained in the open position;

moving the third heat shield element having in each case a groove on opposite sides into the space in the direction of the support structure with a seal element in each case protruding into one of these grooves;

displacing the seal element in each case from the open position to the closed position through the intermediary position due to the movement (B) of the third heat shield element; and anchoring the third heat shield element on the support structure wherein in the open position the first and second seal elements are not connected with the second heat shield element, in the intermediary position the first and second seal elements are connected with the second heat shield element and the second heat shield element is spaced from the support structure, and in the closed position the first and second seal elements are engaged with the second heat shield element.

16. The method according to claim 15, wherein the hot-gas conducting structure is a metal compopent of a gas turbine unit.

17. The method according to claim 15, wherein the hot-gas conducting structure is a combustion chamber.

18. The method according to claim 15, wherein the seal element is displaced from the closed position to the open position due to the vertical movement of the second heat shield element.

* * * * *